Aug. 2, 1960    D. E. WOBBE ET AL    2,947,274
CAN BODY FLUXING MECHANISM
Filed Sept. 18, 1956    3 Sheets-Sheet 1

INVENTORS
DELBERT E. WOBBE
FRANK P. FALLAR
BY Charles H. Erne
Leland R. McCann
George W. Reiber
ATTORNEYS

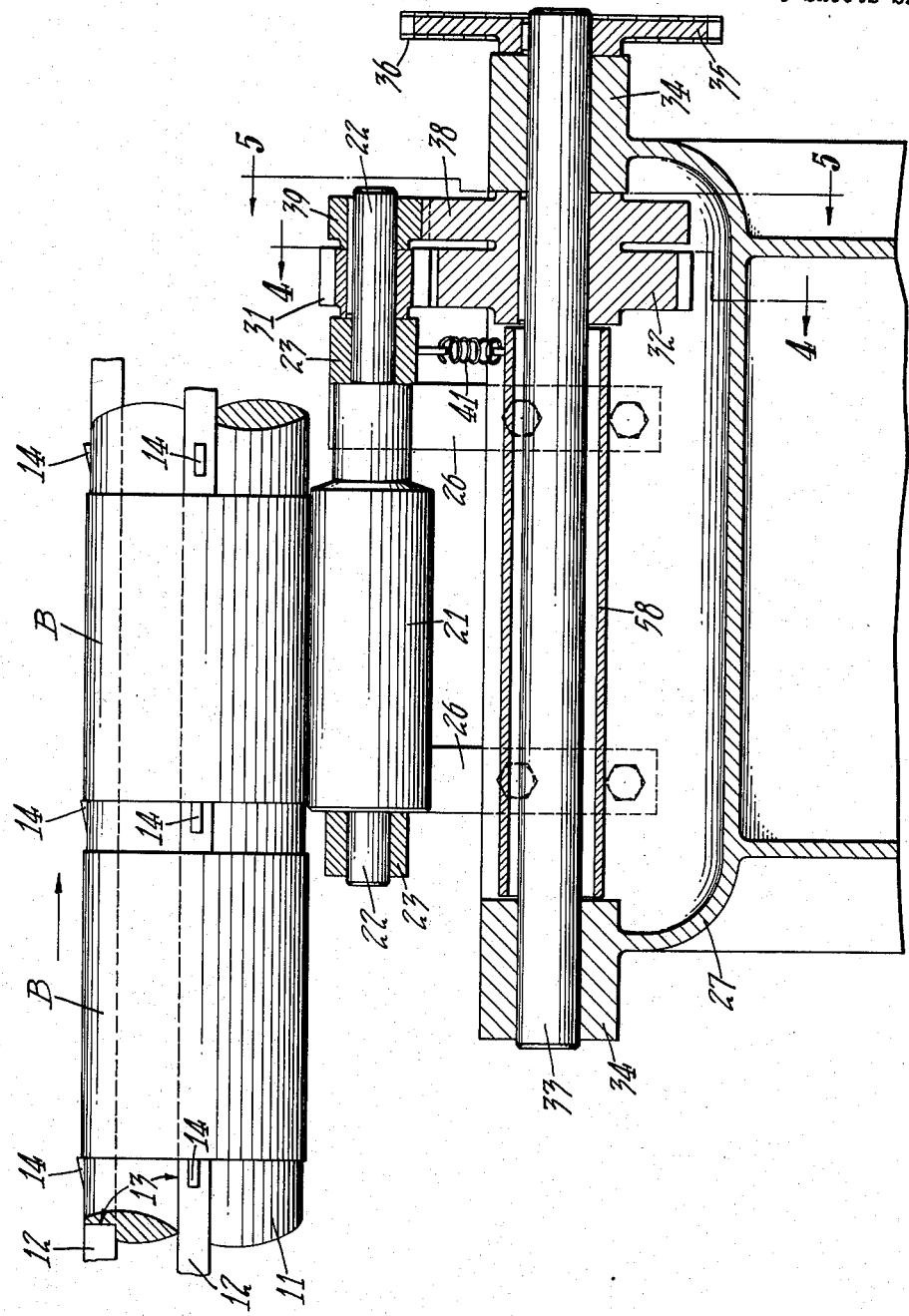

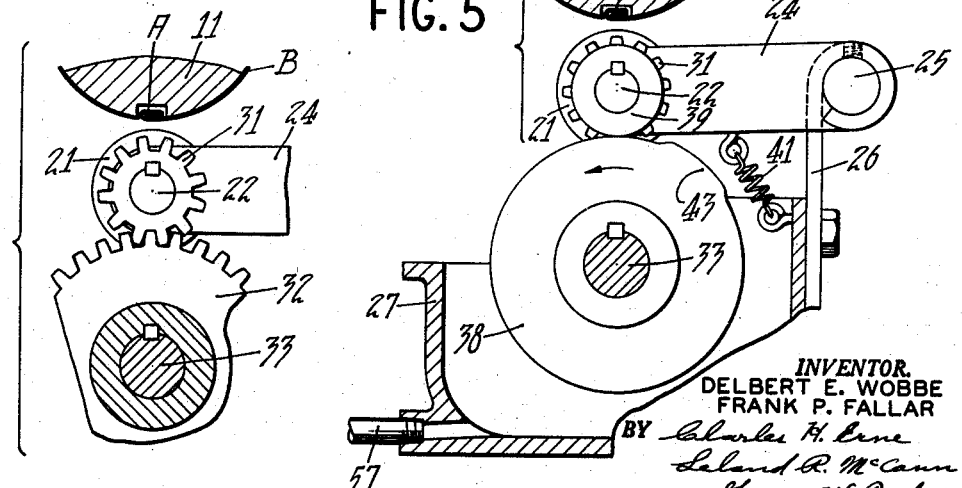

United States Patent Office 2,947,274
Patented Aug. 2, 1960

2,947,274

CAN BODY FLUXING MECHANISM

Delbert E. Wobbe, Cary, and Frank P. Fallar, Chicago, Ill., assignors to American Can Company, New York, N.Y., a corporation of New Jersey Filed Sept. 18, 1956, Ser. No. 610,583

2 Claims. (Cl. 113—95)

The present invention relates to a solder fluxing mechanism for can body making machines and has particular reference to an improved roller fluxing mechanism for applying flux to a side seam of a can body.

An object of the instant invention is to obtain better control over the quantity of flux applied to the can bodies and to eliminate splashing of the flux by the elimination of the usual flux pot and parts operating therein.

Numerous other objects and advantages of the invention will be apparent as it is better understood from the following description, which, taken in connection with the accompanying drawings, discloses a preferred embodiment thereof.

Referring to the drawings:

Fig. 2 is a vertical sectional view taken substantially along the line 2—2 in Fig. 1; with parts broken away;

Fig. 3 is an enlarged fragmentary sectional view taken substantially along the line 3—3 in Fig. 1;

Figs. 4 and 5 are sectional views taken substantially along the lines 4—4, 5—5 respectively in Fig. 2, with parts broken away; and Fig. 6 is a fragmentary sectional view of certain of the parts in Fig. 4 shown in a different position.

Figure 1:
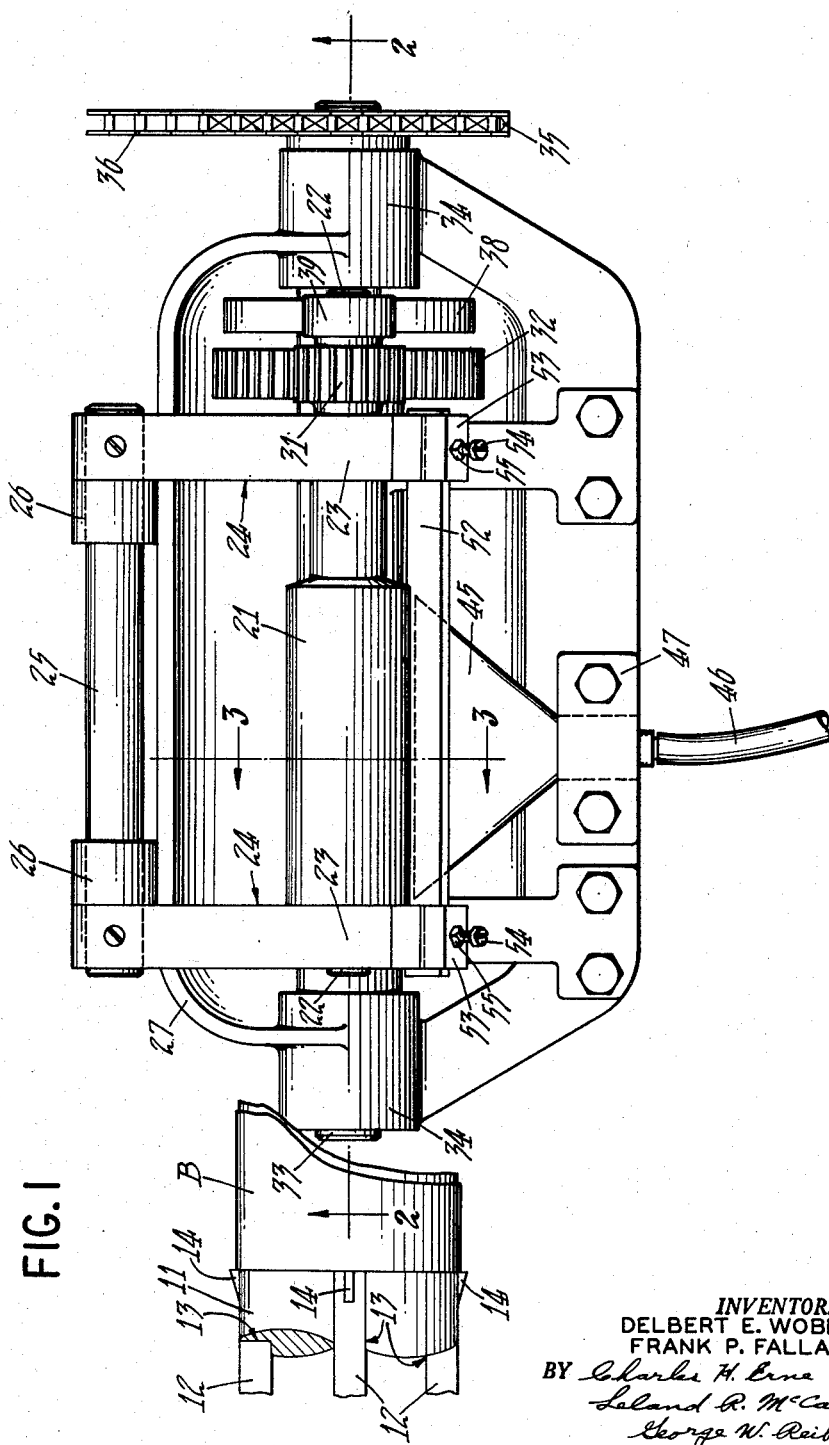
Figure 1 is a top plan view of a solder fluxing mechanism embodying the instant invention, with parts broken away.

As a preferred or exemplary embodiment of the instant invention the drawings illustrate a fluxing mechanism for applying a fluid fluxing material to the side seam A (Figs. 3 and 4) of a sheet metal can body B while in position on a supporting horn 11 of a conventional can body making machine. The horn 11 is provided with reciprocating feed bars 12, disposed in longitudinal grooves 13 in the horn and each feed bar 12 is provided with spaced feed dogs 14 for advancing the bodies along the horn in processional order for individual location at a fluxing station of the can body making machine. This is a conventional arrangement.

The fluxing mechanism located at the fluxing station preferably comprises in part, a continuously rotating flux applying roller 21 extending longitudinally of and parallel with the horn 11 and disposed beneath the horn in spaced relation thereto in longitudinal alignment with the path of travel of the side seams A of the can bodies B advanced along the horn. The flux applying roller 21 is slightly longer than the length of the can bodies B and at its ends is formed with trunnions 22 which are journaled in bearings 23 formed in a pair of parallel arms 24 rigidly connected to a hinge bar 25. The hinge bar 25 is loosely mounted for hinging action in a pair of spaced brackets 26 secured to one side of a drip pot 27 located under the roller and mounted on the frame of the can body making machine.

The flux applying roller 21 is rotated continuously through a spur gear 31 which is mounted on one of the trunnions 22 and which meshes with a driving gear 32. The gear 32 is mounted on a driving shaft 33 disposed beneath the roller 21 in parallelism therewith and at its ends is journaled in bearings 34 formed in the drip pot 27. The driving shaft 33 extends beyond one of the bearings 34 and carries a sprocket 35 which is driven by an endless chain 36, actuated through conventional sprockets, shafts and gears in time with and by connection with, the feed bars 12 in the horn 11.

As each can body B is advanced into the fluxing station, with its side beam A located in alignment with the flux applying roller 21, the roller, carrying a controlled thickness film of fluid flux material thereon, is bodily lifted into engagement with the side seam A to apply the flux material to the seam along its entire length. This lifting of the flux applying roller 21 is effected by cam action in time with the advancement of the can body B into the fluxing station. For this purpose, the roller drive shaft 33 carries an edge cam 38 which operates against a cam roller 39 on one of the flux roller trunnions 22 (see Figs. 1, 2 and 5). A tension spring 41 stretched between the drip pot 27 and one of the hinged arms 24, keeps the cam roller 39 in engagement with the cam 38.

The periphery of the cam 38 preferably is concentric with the driving shaft 33 except at one place where it is formed with a projection or high spot 43 (Fig. 5) which is located to lift the flux applying roller 21 at the proper time and to maintain the roller in this lifted position against the side seam A for a time interval of predetermined duration to wipe a predetermined amount of flux material onto the seam. During this lifting action the driving gears 31, 32 remain in mesh to continue the rotation of the flux applying roller, the teeth on the gears being extra long to permit of sufficient separation without becoming unmeshed.

The flux material carried on the flux applying roller 21 is continuously supplied thereto by an elongated nozzle 45 (Figs. 1, 3 and 4) which is disposed adjacent the flux applying roller and which is connected by a pipe 46 to a suitable supply of the flux material under pressure. This nozzle is mounted in a bracket 47 secured to the drip pot 27. The discharge end of the nozzle 45 preferably is flat and flared outwardly along the entire length of the applying roller 21 and is provided with a long narrow flat orifice 48 (Fig. 3) disposed immediately adjacent the outer periphery and along the entire length of the applying roller as shown in Fig. 3 so as to deposit a film of the flux material on the roller without splashing it onto adjacent parts of the machine.

Control of the thickness of the film of flux material on the applying roller 21 preferably is accomplished by a conventional valve (not shown) in the supply pipe 46 and by an adjustable doctor blade 52 (Figs. 1, 3 and 4) which extends along the length of the applying roller 21 adjacent its outer periphery. The ends of the doctor blade 52 are carried in slotted brackets 53 secured to the bearing ends of the hinge arms 24 so as to move with the roller. Adjusting screws 54 threadedly engaged in the brackets and in the doctor blade are provided for adjusting the blade and lock nuts 55 on the screws are provided to lock the blade in an adjusted position.

Hence as the fluid flux material is projected or sprayed from the nozzle 45 onto the outer periphery of the rotating applying roller 21, the doctor blade 52 scrapes off residual material and leaves on the roller a film of a predetermined thickness for application to the can body side seams A at the proper time by the lifting of the roller into engagement with the seam. The residual flux material drops down into the drip pot 27 and is drained off through a drain pipe 57 (Fig. 4) connected to the drip pot near its bottom. This residual flux material is prevented from gathering on the drive shaft 33 by means of a protecting sleeve 58 (Fig. 2) which surrounds and encloses the shaft for its exposed length.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a mechanism for solder fluxing the side seams of container bodies, said mechanism including a horn for supporting a can body at a fluxing station, a rotatable flux applying roll of substantially the length of the can body disposed adjacent the horn at said station for fluxing said side seam in a single operation simultaneously throughout the longitudinal extent of the seam, and means for pivotally mounting said roll for vertical tilting movement towards and away from said can body on said horn: the improvement comprising an axially fixed drive shaft having a gear thereon provided with elongated teeth meshing with elongated teeth of a gear on said flux applying roll for continuously rotating the latter, a flat elongated nozzle disposed parallel to the roll axis and spaced from the periphery of said roll, said nozzle having a long narrow and restricted discharge orifice extending longitudinally of the roll for projecting a film of liquid flux under pressure against the roll periphery throughout its longitudinal extent, cooperating cam means on said roll and drive shaft for bodily tilting said roll on its pivotal axis relative to said drive shaft into peripheral engagement with said side seam to apply liquid flux thereto and maintaining said elongated gear teeth in meshing engagement in all positions of the roll, and a doctor blade mounted for bodily movement with said roll for controlling the thickness of the projected film of liquid flux on said roll prior to its application to the can body side seam.

2. The solder fluxing mechanism of claim 1, wherein said drive shaft is journaled in a drip pot disposed beneath said flux applying roll, and a protective sleeve surrounding said drive shaft to prevent surplus flux from said applying roll from contacting the shaft.

References Cited in the file of this patent

UNITED STATES PATENTS

| | | |
|---|---|---|
| 1,318,871 | Heine | Oct. 14, 1919 |
| 1,884,842 | Peters | Oct. 25, 1932 |
| 2,185,088 | Kronquest | Dec. 26, 1939 |
| 2,199,228 | Obenshain et al. | Apr. 30, 1940 |
| 2,313,751 | Hunter | Mar. 16, 1943 |
| 2,460,866 | Wobbe et al. | Feb. 8, 1949 |
| 2,469,392 | Jones et al. | May 10, 1949 |
| 2,597,893 | Nordquist | May 27, 1952 |
| 2,649,758 | Cowgill | Aug. 25, 1953 |